United States Patent Office

3,589,918
Patented June 29, 1971

3,589,918
OPTICAL GLASS AND PROCESS FOR ITS MANUFACTURE
Walter Jahn, Ingelheim, Germany, assignor to JENAer Glaswerk Schott & Gen., Mainz, Germany
No Drawing. Filed Nov. 1, 1968, Ser. No. 773,374
Claims priority, application Germany, Nov. 14, 1967, P 15 96 864.6
Int. Cl. C03c 3/04
U.S. Cl. 106—53    15 Claims

ABSTRACT OF THE DISCLOSURE

Optical glass compositions comprising 25 to 65 wt. percent $SiO_2$, 4–35 wt. percent $K_2O$, 4–45 wt. percent $TiO_2$ and 3–45 wt. percent $Sb_2O_3$, characterized in that the minimum content of $TiO_2$ plus $Sb_2O_3$ amounts to 18 wt. percent.

---

This invention relates to optical glass compositions and has particular reference to glasses which at relatively low indices of refraction have dispersion values greater than that of conventional flint glass and to a process of making the same.

For the manufacture of well-corrected lens systems, crown glasses are required together with flint glasses which at relatively low indices of refraction have a dispersion that is greater than that of conventional flint glasses. Glasses of this type, which are referred to as low flints, contain more or less large amounts of titanium oxide, which contributes greatly towards increasing the dispersion. Flint glasses containing titanium oxide are already known, both with a phosphate base and with a silicate base. Phosphate glasses containing titanium oxide provide compositions which exhibit generally, more extreme optical values as regards high dispersion combined with the lowest possible refraction. Examples of the latter phosphate glasses containing titanium oxide are the glasses disclosed in German Pat. No. 939,531.

However, the melting of such glasses as required in connection with their production is difficult and complicated because of the relatively low resistance to devitrification of these compositions. Silicate-base low flints, which are conventionally prepared on a basis of the well-known three-component system of $SiO_2$-$Na_2O$-$TiO_2$, exhibit optical values that differ only slightly from those of conventional lead silicate-base flint glasses. It is known that the addition of fluoride can improve the optical values, the same having been described, for instance, in German Pat. No. 973,350. The state of the art does permit the manufacture of optical glasses containing fluoride, but to do so one must accept the fact that the process of the manufacture of such glasses is an extremely costly one.

One of the primary objects of the invention is to provide novel glasses which at relatively low indices of refraction have a dispersion which is greater than that of conventional flint glasses.

Another object is to provide glasses of the above nature which are free of fluorine and are characterized by low cost of manufacture.

Other objects and advantages of the present invention will become apparent from the following description.

The above objects are achieved by the finding of a new field of glasses comprising 25–65 wt. percent $SiO_2$, 4–35 wt. percent $K_2O$, 4–45 wt. percent $TiO_2$ and 3–45 wt. percent $Sb_2O_3$, in which the sum of the percentages of $TiO_2$ plus $Sb_2O_3$ amounts to at least 18 wt. percent.

The maximum amounts of the other components change somewhat according to the percentages of $K_2O$, the percentage of $TiO_2$ being limited by the incipient crystallization (devitrification) area and the percentage of $Sb_2O_3$ being limited by the increasing yellow-brown discoloration thereby produced which would eventually prevent the use of these glasses for optical purposes.

Accordingly, at a $K_2O$ content of up to 15%, the maximum percentage of $TiO_2$ amounts to 35%, and that of $Sb_2O_3$ amounts to 45%.

At a $K_2O$ content of above 15%, the maximum percentages of $TiO_2$ and $Sb_2O_3$ amount to 45% and 38% respectively.

The $K_2O$ can be replaced wholly or partially by $Na_2O$ although the optical values obtained are then less extreme. Additionally, the color and stability of the glasses may be impaired.

PbO is suitable for varying the range of the optical values within relatively wide limits, the content thereof can amount to as much as 40%. In particular, it permits the dispersion to be increased and the $TiO_2$ content to be diminished.

MgO, CaO, SrO, BaO, ZnO, CdO, $B_2O_3$, $Al_2O_3$, $As_2O_3$, $Nb_2O_3$, $Ta_2O_5$ and $WO_3$, individually or in mixtures, and in quantities of up to 8% are particularily suitable for varying the range of the optical values within narrower limits.

Glasses having high $TiO_2$ or $Sb_2O_3$ contents may exhibit an undesirable strong yellow or brown coloration. The intensity of this color can be greatly reduced by the addition of oxidizing substances during the melting, such as for example, sodium arsenate. Further the introduction of oxygen or other oxidizing gases during the melting can improve the color.

The following example will serve to illustrate the invention and in particular a method of a simple and efficient nature for producing the novel glasses of the invention. The same is given by way of illustration only and should not be construed as limitative of the invention.

EXAMPLE

A batch of 1000 grams, comprised of 570 g. $SiO_2$, 140 g. $TiO_2$, 190 g. $Sb_2O_3$, 100 g. $K_2O$ (in the form of $K_2CO_3$) and 5 g. of $Na_2HAsO_4$, was placed in a ceramic crucible and heated to a temperature of about 1460° C. in an electrically heated or gas heated furnace. After the batch had fused it was refined for one hour at 1500° C. The glass was then stirred for about one hour, while the furnace was cooled down to 1460° C. The glass was thereafter poured at 1440° C. into a preheated iron mold and then transferred to a lehr which was at a temperature of 550° C. and was cooled at a rate of about 7° per hour down to room temperature.

In the table which follows, examples of glasses according to the invention have been set out. All mounts specified are percentages by weight.

These glasses all show good resistance to weather and to acids.

TABLE

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $K_2O$ | 7.0 | 7.0 | 7.0 | 10.0 | 10.0 | 10.0 | 10.0 | 19.0 | 20.0 | 20.0 | 20.0 | 25.0 | 25.0 | 35.0 |
| $Sb_2O_3$ | 40.0 | 25.0 | 35.0 | 7.0 | 3.0 | 40.0 | 24.0 | 3.0 | 38.0 | 8.0 | 10.0 | 10.0 | 20.0 | 10.0 |
| $SiO_2$ | 40.0 | 48.0 | 53.0 | 62.0 | 53.0 | 28.0 | 46.0 | 33.0 | 31.0 | 39.0 | 48.0 | 25.0 | 30.0 | 30.0 |
| $TiO_2$ | 13.0 | 20.0 | 5.0 | 21.0 | 34.0 | 22.0 | 20.0 | 45.0 | 11.0 | 33.10 | 22.0 | 40.0 | 25.0 | 25.0 |
| $n_d$ | 1.6984 | 1.6976 | 1.6312 | 1.6229 | 1.6831 | 1.7590 | 1.6780 | 1.7003 | 1.6975 | 1.7072 | 1.6436 | 1.7580 | 1.6863 | 1.6456 |
| $v_d$ | 27.02 | 26.53 | 33.25 | 32.01 | 26.61 | 24.16 | 28.28 | 23.95 | 28.57 | 27.18 | 32.86 | 24.68 | 29.44 | 33.51 |

| | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|
| $K_2O$ | | | | 4.8 | 4.8 | 10.0 | 10.0 | 10.0 | 10.0 | 10.0 | 10.0 | 10.0 | 12.0 | 9.0 | 14.0 | 8.0 | 27.0 |
| $Sb_2O_3$ | 10.0 | | | 14.3 | 33.3 | 18.0 | 18.0 | 18.0 | 18.0 | 18.0 | 18.0 | 18.0 | 8.0 | 11.0 | 10.0 | 10.0 | 3.0 |
| $SiO_2$ | 50.0 | | | 38.1 | 42.8 | 54.0 | 54.0 | 54.0 | 54.0 | 54.0 | 54.0 | 54.0 | 55.0 | 54.0 | 52.0 | 52.0 | 28.0 |
| $TiO_2$ | 21.0 | | | 4.8 | 4.8 | 13.0 | 13.0 | 13.0 | 13.0 | 13.0 | 13.0 | 13.0 | 21.0 | 20.0 | 18.0 | 14.0 | 40.0 |
| PbO | | | | 38.0 | 14.3 | | | | | | | | | | | 8.0 | |
| $B_2O_3$ | | | | | | 5.0 | | | | | | | | | | | |
| $P_2O_5$ | | | | | | | 5.0 | | | | | | | | | | |
| $Na_2O$ | 19.0 | | | | | | | | | | | | | | | 4.0 | |
| $As_2O_3$ | | | | | | | | 5.0 | | | | | | | | | |
| MgO | | | | | | | | | | | | | 4.0 | | | | |
| $WO_3$ | | | | | | | | | 5.0 | | | | | | | 4.0 | |
| $Al_2O_3$ | | | | | | | | | | | | | | | | | 2.0 |
| $Nb_2O_5$ | | | | | | | | | | 5.0 | | | | | | | |
| CaO | | | | | | | | | | | | | | 6.0 | | | |
| $Ta_2O_5$ | | | | | | | | | | | 5.0 | | | | | | |
| CdO | | | | | | | | | | | | | | | 6.0 | | |
| TnO | | | | | | | | | | | | 5.0 | | | | | |
| $n_d$ | 1.6370 | 1.7053 | 1.6733 | 1.6121 | 1.6282 | 1.6321 | 1.6288 | 1.6376 | 1.6306 | 1.6246 | 1.6357 | 1.6505 | 1.6454 | 1.6397 | 1.7252 |
| $v_d$ | 34.18 | 28.65 | 30.21 | 33.90 | 32.91 | 32.95 | 32.91 | 32.21 | 33.08 | 33.86 | 32.49 | 32.36 | 32.51 | 31.80 | 26.33 |

What is claimed is:

1. An optical glass composition consisting essentially of 25–65 wt. percent $SiO_2$, 4–35 wt. percent $K_2O$, 4–45 wt. percent $TiO_2$ and 3–45 wt. percent $Sb_2O_3$ in which the sum of the percentages of $TiO_2$ and $Sb_2O_3$ amounts to at least 18 wt. percent.

2. Optical glass of claim 1 in which at a $K_2O$ content of up to 15 wt. percent, the content of $TiO_2$ does not exceed 35 wt. percent and that of $Sb_2O_3$ does not exceed 45 wt. percent.

3. Optical glass of claim 1 in which at a $K_2O$ content exceeding 15 wt. percent, the content of $TiO_2$ does not exceed 45 wt. percent and that of $Sb_2O_3$ does not exceed 38 wt. percent.

4. Optical glass of claim 1 in which at least a part of the $K_2O$ is replaced by $Na_2O$.

5. Optical glass of claim 1 containing additionally up to 40 wt. percent PbO.

6. Optical glass of claim 1 containing at least one member selected from the group consisting of MgO, CaO, SrO, BaO, ZnO, CdO, $B_2O_3$, $Al_2O_3$, $As_2O_3$, $Nb_2O_5$, $Ta_2O_5$ and $WO_3$ in an amount of up to 8 wt. percent.

7. Optical glass of claim 1 containing 7 wt. percent $K_2O$, 40 wt. percent $Sb_2O_3$, 40 wt. percent $SiO_2$ and 13 wt. percent $TiO_2$.

8. Optical glass of claim 1 containing 10 wt. percent $K_2O$, 7 wt. percent $Sb_2O_3$, 62 wt. percent $SiO_2$ and 21 wt. percent $TiO_2$.

9. Optical glass of claim 1 containing 19 wt. percent $K_2O$, 3 wt. percent $Sb_2O_3$, 33 wt. percent $SiO_2$ and 45 wt. percent $TiO_2$.

10. Optical glass of claim 1 containing 20 wt. percent $K_2O$, 38 wt. percent $Sb_2O_3$, 31 wt. percent $SiO_2$ and 11 wt. percent $TiO_2$.

11. Optical glass of claim 1 containing 25 wt. percent $K_2O$, 10 wt. percent $Sb_2O_3$, 25 wt. percent $SiO_2$ and 40 wt. percent $TiO_2$.

12. Optical glass of claim 4 containing 10 wt. percent $Sb_2O_3$, 50 wt. percent $SiO_2$, 21 wt. percent $TiO_2$ and 19 wt. percent $Na_2O$.

13. Optical glass of claim 5 containing 4.8 wt. percent $K_2O$, 14.3 wt. percent $Sb_2O_3$, 38.1 wt. percent $SiO_2$, 4.8 wt. percent $TiO_2$ and 38 wt. percent PbO.

14. Optical glass of claim 6 containing 27 wt. percent $K_2O$, 3 wt. percent $Sb_2O_3$, 28 wt. percent $SiO_2$, 40 wt. percent $TiO_2$ and 2.0 wt. percent $Al_2O_3$.

15. The method of manufacture comprising the steps of preparing a glass batch consisting essentially of 25–65 wt. percent $SiO_2$, 4–35 wt. percent $K_2O$, 4–45 wt. percent $TiO_2$ and 3–45 wt. percent $Sb_2O_3$ in which the sum of the percentages of $TiO_2$ and $Sb_2O_3$ amounts to at least 18 wt. percent, heating said batch at a temperature and for a period sufficient to melt the ingredients thereof and produce a homogeneous glassy structure, annealing said structure at a lower temperature and slowly cooling said structure to room temperature, to thereby produce a clear durable transparent optical glass.

References Cited

UNITED STATES PATENTS

| 2,838,408 | 6/1958 | Rindone | 106—53 |
| 2,861,001 | 11/1958 | Rindone | 106—53 |

FOREIGN PATENTS

| 1,271,757 | 12/1966 | Germany | 106—52 |

ROBERT D. EDMONDS, Primary Examiner

U.S. Cl. X.R.

106—52, 54